United States Patent
Matsunami et al.

(10) Patent No.: US 11,480,520 B2
(45) Date of Patent: Oct. 25, 2022

(54) WATER CONTENT SENSOR AND ROAD SURFACE STATE DETECTION DEVICE

(71) Applicant: PANASONIC INTELLECTUAL PROPERTY MANAGEMENT CO., LTD., Osaka (JP)

(72) Inventors: Hirotaka Matsunami, Osaka (JP); Masanori Hayashi, Osaka (JP); Toru Baba, Hyogo (JP); Yoshifumi Watabe, Osaka (JP); Noriyuki Yasuike, Osaka (JP); Takashi Nakagawa, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 447 days.

(21) Appl. No.: 16/641,599

(22) PCT Filed: Jul. 20, 2018

(86) PCT No.: PCT/JP2018/027223
§ 371 (c)(1),
(2) Date: Feb. 24, 2020

(87) PCT Pub. No.: WO2019/044252
PCT Pub. Date: Mar. 7, 2019

(65) Prior Publication Data
US 2020/0408676 A1    Dec. 31, 2020

(30) Foreign Application Priority Data
Aug. 29, 2017 (JP) .............................. JP2017-164435

(51) Int. Cl.
*G01N 21/3554* (2014.01)
*G01W 1/02* (2006.01)
(Continued)

(52) U.S. Cl.
CPC ......... *G01N 21/3554* (2013.01); *G01F 22/00* (2013.01); *G01W 1/02* (2013.01); *G01W 1/14* (2013.01)

(58) Field of Classification Search
CPC .. G01N 21/3554; G01N 21/314; G01F 22/00; G01W 1/02; G01W 1/14; G01W 1/00
See application file for complete search history.

(56) References Cited

U.S. PATENT DOCUMENTS

| | | |
|---|---|---|
| 2005/0047864 A1 | 3/2005 | Yamada et al. |
| 2015/0211928 A1 | 7/2015 | Itoh et al. |
| 2017/0096144 A1 | 4/2017 | Elie et al. |

FOREIGN PATENT DOCUMENTS

| | | | |
|---|---|---|---|
| EP | 3677897 B1 * | 11/2021 | ........... G01N 21/314 |
| JP | S59-208442 A | 11/1984 | |

(Continued)

OTHER PUBLICATIONS

International Search Report and Written Opinion dated Oct. 16, 2018 in International Application No. PCT/JP2018/027223; with partial English translation.

(Continued)

*Primary Examiner* — David P Porta
*Assistant Examiner* — Gisselle M Gutierrez
(74) *Attorney, Agent, or Firm* — McDermott Will & Emery LLP (57) ABSTRACT

A water content sensor includes: a light emitter that emits detection light having a first wavelength band and reference light a second wavelength band toward a road surface; a first light receiver that converts the detection light reflected by the road surface to a first electric signal; a second light receiver that converts the reference light reflected by the road surface to a second electric signal; and a computation processor that detects the amount of water based on a signal ratio between the first electric signal and the second electric (Continued)

signal. The computation processor detects the amount of water based on the signal ratio obtained when the signal intensity of at least one of the first electric signal and the second electric signal is within a predetermined range defined relative to a reference value.

7 Claims, 6 Drawing Sheets

(51) Int. Cl.
*G01W 1/14* (2006.01)
*G01F 22/00* (2006.01)

(56) References Cited

FOREIGN PATENT DOCUMENTS

| JP | S60-034697 U | 3/1985 |
|---|---|---|
| JP | H05-118984 A | 5/1993 |
| JP | H06-229917 A | 8/1994 |
| JP | H09-269381 A | 10/1997 |
| JP | 2001-141650 A | 5/2001 |
| JP | 2003-050198 A | 2/2003 |
| JP | 2006-046936 A | 2/2006 |
| JP | 2008-128945 A | 6/2008 |
| JP | 4814655 B2 | 11/2011 |
| JP | 2013-168155 A | 8/2013 |
| WO | 2015/008435 | 1/2015 |

OTHER PUBLICATIONS

Extended European Search Report dated Sep. 22, 2020 issued in European patent application No. 18849537.8.

Office Action dated Jan. 4, 2022 issued in corresponding Chinese patent application No. 2018800550090.0, with English translation.

* cited by examiner

WATER CONTENT SENSOR AND ROAD SURFACE STATE DETECTION DEVICE

CROSS-REFERENCE OF RELATED APPLICATIONS

This application is the U.S. National Phase under 35 U.S.C. § 371 of International Patent Application No. PCT/JP2018/027223, filed on Jul. 20, 2018, which in turn claims the benefit of Japanese Application No. 2017-164435, filed on Aug. 29, 2017, the entire disclosures of which Applications are incorporated by reference herein.

TECHNICAL FIELD

The present invention relates to a water content sensor and a road surface state detection device.

BACKGROUND ART

Conventionally, as a water content sensor, for example, an infrared water meter that measures the amount of water by using absorption of infrared rays by water is known (see, for example, Patent Literature 1 (PTL 1)).

CITATION LIST

Patent Literature

PTL 1: Japanese Unexamined Patent Application Publication No. H5-118984

SUMMARY OF THE INVENTION

Technical Problem

In order to detect the state of a road surface, a water content sensor may be used to detect the amount of water on the road surface. However, in reality, the accuracy of the result of detection is insufficient due to a cause such as, for example, infrared rays being blocked by a mobile body, such as an automobile, that runs on the road surface.

In view of the above, it is an object of the present invention to provide a water content sensor and a road surface state detection device, with which it is possible to suppress the influence of a mobile body moving on a road surface and increase the accuracy of the result of detection.

Solution to Problem

In order to achieve the object described above, a water content sensor according to an aspect of the present invention is a water content sensor that emits light to a road surface and detects an amount of water on the road surface based on reflected light reflected by the road surface, the water content sensor including: a light emitter that emits the light toward the road surface, the light including detection light having a first wavelength band in which absorption by water is greater than a predetermined value and reference light having a second wavelength band in which the absorption by water is less than or equal to the predetermined value; a first light receiver that receives the detection light reflected by the road surface and converts the detection light to a first electric signal; a second light receiver that receives the reference light reflected by the road surface and converts the reference light to a second electric signal; and a computation processor that detects the amount of water on the road surface based on a signal ratio between the first electric signal and the second electric signal, wherein the computation processor detects the amount of water based on the signal ratio obtained when a signal intensity of at least one of the first electric signal and the second electric signal is within a predetermined range defined relative to a reference value.

Also, a road surface state detection device according to an aspect of the present invention includes the water content sensor described above and a display that displays information based on the amount of water detected by the water content sensor.

Advantageous Effect of Invention

With the water content sensor and the road surface state detection device according to the present invention, it is possible to suppress the influence of a mobile body moving on a road surface and increase the accuracy of the result of detection.

DESCRIPTION OF EXEMPLARY EMBODIMENT

Hereinafter, a water content sensor and a road surface state detection device according to an embodiment of the present invention will be described in detail with reference to the drawings. The embodiment described below is a preferred specific example of the present invention. Accordingly, the numerical values, shapes, materials, structural elements, the arrangement and connection of the structural elements, and the like shown in the following embodiment are merely examples, and therefore are not intended to limit the scope of the present invention. Accordingly, among the structural elements described in the following embodiment, structural elements not recited in any one of the independent claims are described as arbitrary structural elements.

In addition, the diagrams are schematic representations, and are not necessarily drawn to scale. Accordingly, for example, the scale is not necessarily the same for all of the diagrams. Also, in the diagrams, structural elements that have substantially the same configuration are given the same reference numerals, and a redundant description will be omitted or simplified.

EMBODIMENT

[Road Surface State Detection Device]

Road surface state detection device 100 according to an embodiment will be described first.

Figure 1:
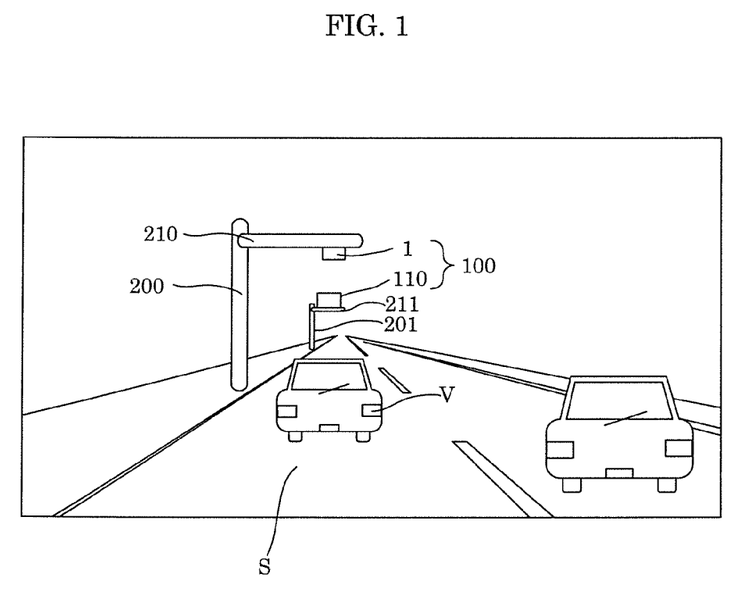
FIG. 1 is a schematic diagram showing an overall configuration of a road surface state detection device according to an embodiment.

FIG. 1 is a schematic diagram showing an overall configuration of road surface state detection device 100 according to the embodiment. As shown in FIG. 1, road surface state detection device 100 is provided with respect to a pair of support poles 200 and 201 installed on a road side. Specifically, road surface state detection device 100 includes water content sensor 1 and display 110.

Water content sensor 1 is attached to support 210 that extends from the upper portion of support pole 200 to above a roadway. Water content sensor 1 is an optical sensor that detects the amount of water on road surface S of the roadway. Water content sensor 1 is disposed so as to project reference light and detection light toward road surface S that is immediately below water content sensor 1.

Display 110 is installed on support pole 201 that is disposed forward of support pole 200 in the traveling direction. Display 110 is attached to support 211 that extends from the upper portion of support pole 201 to above the roadway. Display 110 is, for example, an electronic highway bulletin board that displays various types of information.

Figure 2:
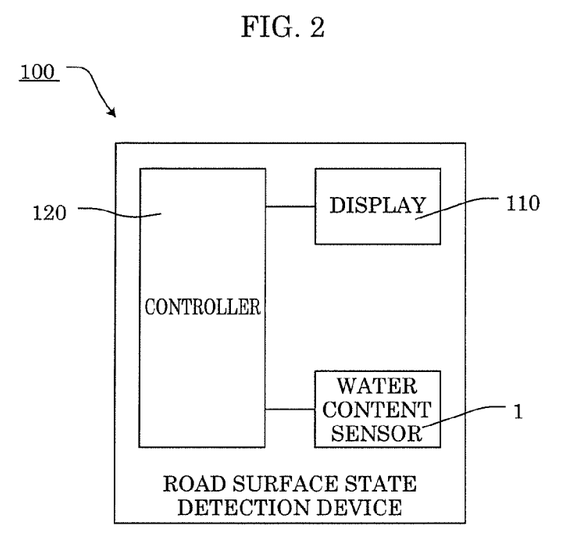
FIG. 2 is a control block diagram of the road surface state detection device according to the embodiment.

FIG. 2 is a control block diagram of road surface state detection device 100 according to the embodiment. As shown in FIG. 2, road surface state detection device 100 includes controller 120 that controls water content sensor 1 and display 110. Controller 120 is configured using, for example, a micro controller. Controller 120 includes a non-volatile memory in which a processing program for controlling water content sensor 1 and display 110 is stored, a volatile memory that is a temporary storage area for executing a program, an input/output port, a processor that executes a program, and the like. Specifically, controller 120 controls display 110 to display information based on the amount of water detected by water content sensor 1. With this configuration, display 110 can inform a driver of vehicle V running on the roadway of the information based on the amount of water on road surface S.

[Water Content Sensor]

An overview of water content sensor 1 according to the embodiment will be described next.

Figure 3:
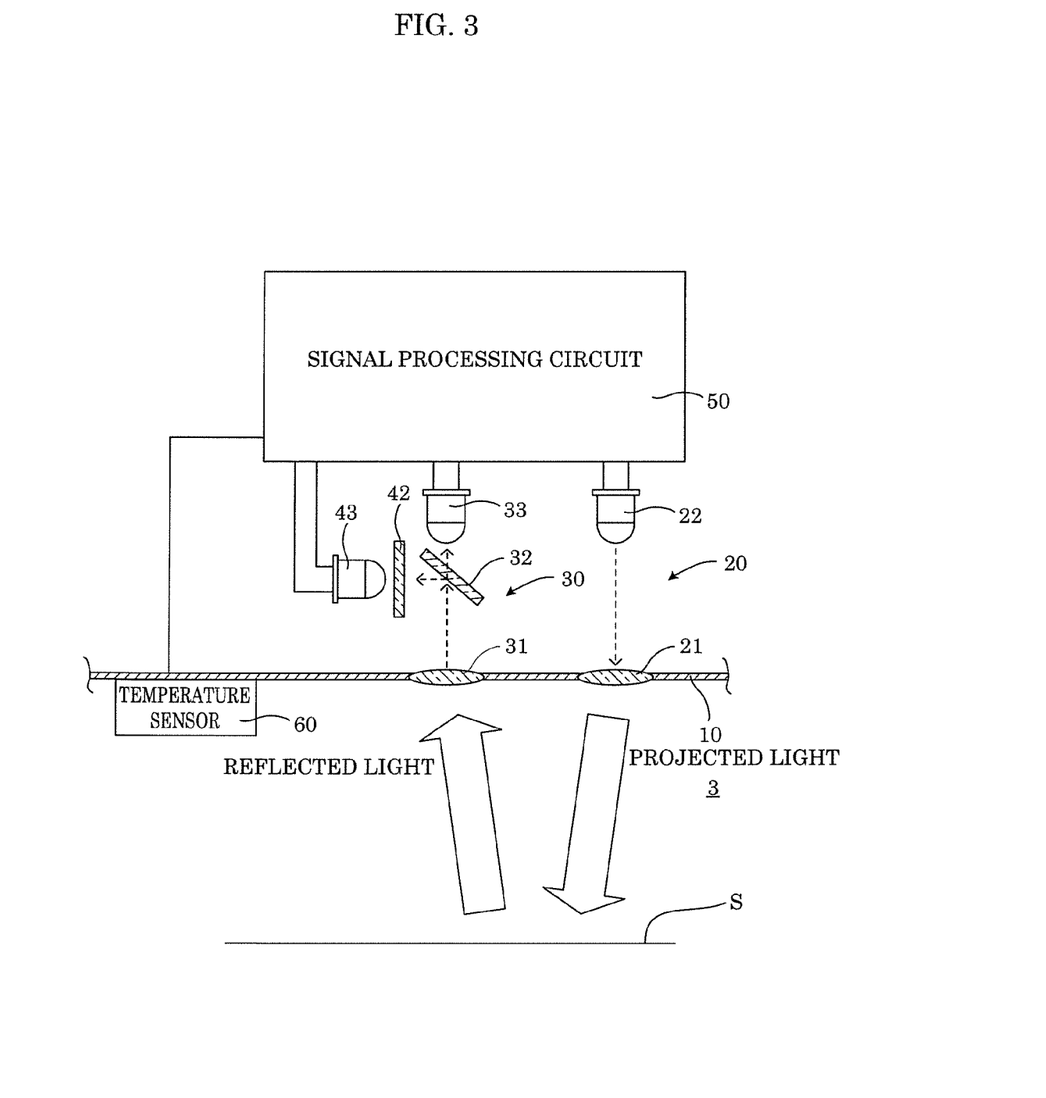
FIG. 3 is a schematic diagram showing a configuration of a water content sensor according to the embodiment and a road surface.
Figure 4:
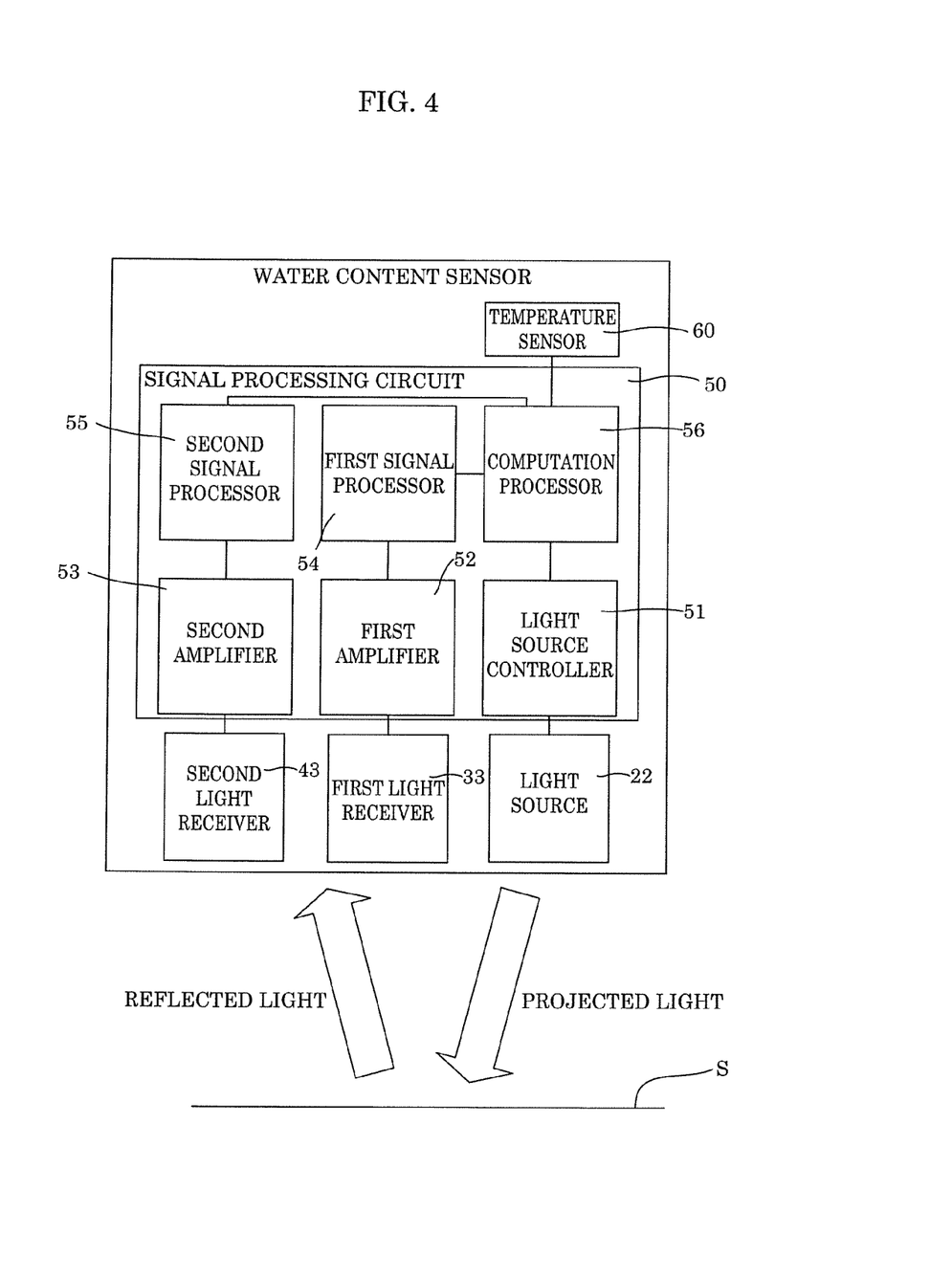
FIG. 4 is a block diagram showing a control configuration of the water content sensor according to the embodiment.

FIG. 3 is a schematic diagram showing a configuration of water content sensor 1 according to the embodiment and road surface S. FIG. 4 is a block diagram showing a control configuration of water content sensor 1 according to the embodiment.

Water content sensor 1 is a water content sensor that emits light to road surface S and detects the amount of water on road surface S based on the light reflected by road surface S.

In the present embodiment, as shown in FIGS. 3 and 4, water content sensor 1 detects the amount of water on road surface S that is present with space 3 interposed therebetween. The expression "the amount of water on road surface S" encompasses the amount of water accumulated on road surface S and the amount of water that has permeated through road surface S.

Water content sensor 1 includes housing 10, light emitter 20, first light receiving module 30, second light receiving module 40, temperature sensor 60, and signal processing circuit 50.

Hereinafter, the structural elements of water content sensor 1 will be described in detail.

[Housing]

Housing 10 is a housing in road surface state detection device 100, and houses light emitter 20, first light receiving module 30, second light receiving module 40, and signal processing circuit 50. Housing 10 is made of a light blocking material. Accordingly, it is possible to prevent outside light from entering housing 10. Specifically, housing 10 is formed using a resin material or a metal material that has the property of blocking light that is to be received by first light receiving module 30 and second light receiving module 40.

A plurality of openings are formed in the outer wall of housing 10, and lens 21 of light emitter 20 and lens 31 of first light receiving module 30 are attached to the openings.

[Light Emitter]

Light emitter 20 is a light emitter that emits, toward road surface S, detection light that includes a first wavelength band in which the absorption by water is greater than a predetermined value, and reference light that includes a second wavelength band in which the absorption by water is less than or equal to the predetermined value. Specifically, light emitter 20 includes lens 21 and light source 22.

Lens 21 is a condensing lens for concentrating light emitted by light source 22 on road surface S. Lens 21 is a convex lens made of a resin, but is not limited thereto.

Light source 22 is an LED (Light Emitting Diode) light source that emits continuous light that includes light in a first wavelength band corresponding to the detection light and light in a second wavelength band corresponding to the reference light and whose peak wavelength is on the second wavelength band side. Specifically, light source 22 is an LED light source made of a compound semiconductor.

Figure 5:
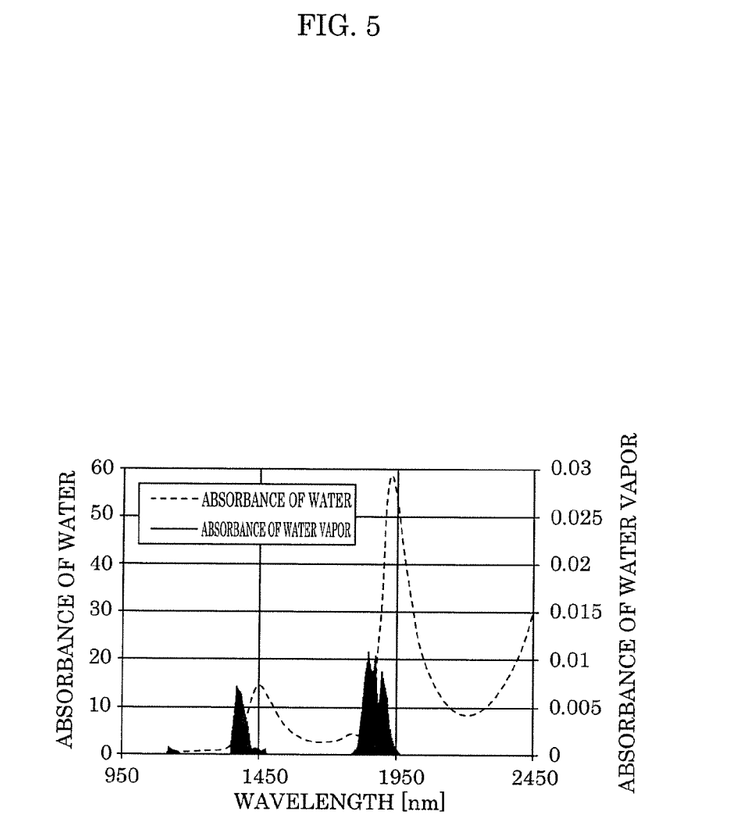
FIG. 5 is a diagram showing light absorption spectra of water and water vapor.

FIG. 5 is a diagram showing light absorption spectra of water and water vapor. As shown in FIG. 5, water has absorption peaks at a wavelength of about 1450 nm and at a wavelength of about 1940 nm. Water vapor has absorption peaks at wavelengths slightly lower than the wavelengths of the absorption peaks of water, specifically, at a wavelength of about 1350 nm to 1400 nm and a wavelength of about 1800 nm to 1900 nm.

Accordingly, a wavelength band in which the absorbance of water is high is selected as the first wavelength band of the detection light, and a wavelength band in which the absorbance of water is smaller than that of the first wavelength band is selected as the second wavelength band of the reference light. As an example, the average wavelength of the second wavelength band is set to be longer than the average wavelength of the first wavelength band. Also, with respect to the center wavelength that is defined by the midpoint value of a wavelength band that is a half value of the maximum transmittance of an optical band-pass filter, for example, the center wavelength of the first wavelength band may be set to 1450 nm, and the center wavelength of the second wavelength band may be set to 1700 nm.

As described above, because light source 22 projects light that continuously includes the first wavelength band and the second wavelength band, the detection light that includes the first wavelength band in which the absorption by water is large and the reference light that includes the second wavelength band in which the absorption by water is smaller than that of the first wavelength band are projected to road surface S.

[First Light Receiving Module]

As shown in FIG. 3, first light receiving module 30 includes lens 31, first band-pass filter 32, and first light receiver 33.

Lens 31 is a condensing lens for concentrating reflected light reflected by road surface S on first light receiver 33. Lens 31 is fixed to housing 10 such that, for example, the focus is positioned on the light receiving surface of first light receiver 33. Lens 31 is, for example, a convex lens made of a resin, but is not limited thereto.

First band-pass filter 32 is a band-pass filter that extracts light in the first wavelength band from the reflected light. Specifically, first band-pass filter 32 is disposed between lens 31 and first light receiver 33 on the optical path of the reflected light that has passed through lens 31 and enters first light receiver 33. Also, first band-pass filter 32 is disposed inclined relative to the optical axis of lens 31. With this configuration, first band-pass filter 32 allows the light in the first wavelength band to pass therethrough, and reflects light in the other wavelength bands.

First light receiver 33 is a light receiving element that receives the light in the first wavelength band that has been reflected by road surface S and passed through first band-pass filter 32, and convers the received light to a first electric signal. First light receiver 33 performs photoelectric conversion on the received light in the first wavelength band and generates a first electric signal according to the amount (or in other words, intensity) of the received light. The generated first electric signal is output to signal processing circuit 50. First light receiver 33 is, for example, a photodiode, but is not limited thereto. For example, first light receiver 33 may be a phototransistor or an image sensor.

[Second Light Receiving Module]

Second light receiving module 40 includes second band-pass filter 42 and second light receiver 43.

Second band-pass filter 42 is a band-pass filter that extracts light in the second wavelength band from the light reflected by first band-pass filter 32. Specifically, second band-pass filter 42 is disposed between first band-pass filter 32 and second light receiver 43 on the optical path of the light that has passed through first band-pass filter 32 and enters second light receiver 43. Second band-pass filter 42 allows the light in the second wavelength band to pass therethrough, and absorbs light in the other wavelength bands.

Second light receiver 43 is a light receiving element that receives the light in the second wavelength band that has been reflected by road surface S and passed through second band-pass filter 42, and convers the received light to a second electric signal. Second light receiver 43 performs photoelectric conversion on the received light in the second wavelength band and generates a second electric signal according to the amount (or in other words, intensity) of the received light. The generated second electric signal is output to signal processing circuit 50. Second light receiver 43 is the same type of light receiving element as first light receiver 33. That is, in the case where first light receiver 33 is a photodiode, second light receiver 43 is also a photodiode.

[Temperature Sensor]

Temperature sensor 60 is a temperature sensor that detects the ambient temperature of water content sensor 1. Specifically, temperature sensor 60 is attached to the outer surface of housing 10, and detects the outside temperature of housing 10. Temperature sensor 60 may be housed in housing 10. Temperature sensor 60 is electrically connected to computation processor 56 included in signal processing circuit 50, and outputs the result of detection to computation processor 56.

[Signal Processing Circuit]

Signal processing circuit 50 is a circuit that performs control to turn on light source 22 of light emitter 20, and computes the amount of water by processing the first electric signal and the second electric signal that were output from first light receiver 33 and second light receiver 43, respectively.

Signal processing circuit 50 may be housed in housing 10, or may be attached to the outer surface of housing 10. Alternatively, signal processing circuit 50 may have a communication function such as wireless communication, and receive the first electric signal from first light receiver 33, the second electric signal from second light receiver 43, and the result of detection from temperature sensor 60.

Specifically, as shown in FIG. 4, signal processing circuit 50 includes light source controller 51, first amplifier 52, second amplifier 53, first signal processor 54, second signal processor 55, and computation processor 56.

Light source controller 51 is configured using a driving circuit and a microcontroller. Light source controller 51 includes a non-volatile memory in which a control program for controlling light source 22 is stored, a volatile memory that is a temporary storage area for executing a program, an input/output port, a processor that executes a program, and the like.

Light source controller 51 controls light source 22 such that light source 22 is repeatedly turned on and off at a predetermined light emission cycle. Specifically, light source controller 51 performs control to turn light source 22 on and off at a predetermined light emission cycle by outputting a pulse signal of a predetermined frequency (for example, 1 kHz) to light source 22.

First amplifier 52 amplifies the first electric signal output by first light receiver 33, and outputs the amplified first electric signal to first signal processor 54. Specifically, first amplifier 52 is an operational amplifier that amplifies the first electric signal.

First signal processor 54 is configured using a microcontroller. First signal processor 54 includes a non-volatile memory in which a processing program for processing the first electric signal is stored, a volatile memory that is a temporary storage area for executing a program, an input/output port, a processor that executes a program, and the like. First signal processor 54 performs pass band limitation on the first electric signal and also corrects a phase delay caused by the pass band limitation, and then performs multiplication with the light emission cycle of light source 22. The processing performed on the first electric signal is so-called lock-in amplification processing. Through this processing, noise based on ambient light can be suppressed in the first electric signal.

Second amplifier 53 amplifies the second electric signal output by second light receiver 43, and outputs the amplified second electric signal to second signal processor 55. Specifically, second amplifier 53 is an operational amplifier that amplifies the second electric signal.

Second signal processor 55 is configured using a microcontroller. Second signal processor 55 includes a non-volatile memory in which a processing program for processing the second electric signal is stored, a volatile memory that is a temporary storage area for executing a program, an input/output port, a processor that executes a program, and the like. Second signal processor 55 performs pass band limitation on the second electric signal and also corrects a phase delay caused by the pass band limitation, and then performs multiplication with the light emission cycle of light source 22. The processing performed on the second electric signal is so-called lock-in amplification processing. Through this processing, noise based on ambient light can be suppressed in the second electric signal.

Computation processor 56 detects the amount of water on road surface S based on the first electric signal output from first light receiver 33 and the second electric signal output from second light receiver 43. Specifically, computation processor 56 detects the amount of water on road surface S based on the ratio (signal ratio) of the voltage level of the first electric signal and the voltage level of the second electric signal. In the present embodiment, computation processor 56 detects the amount of water on road surface S based on the first electric signal processed by first signal processor 54 and the second electric signal processed by second signal processor 55. A specific description of the processing of detecting the amount of water will be given later.

Figure 6:
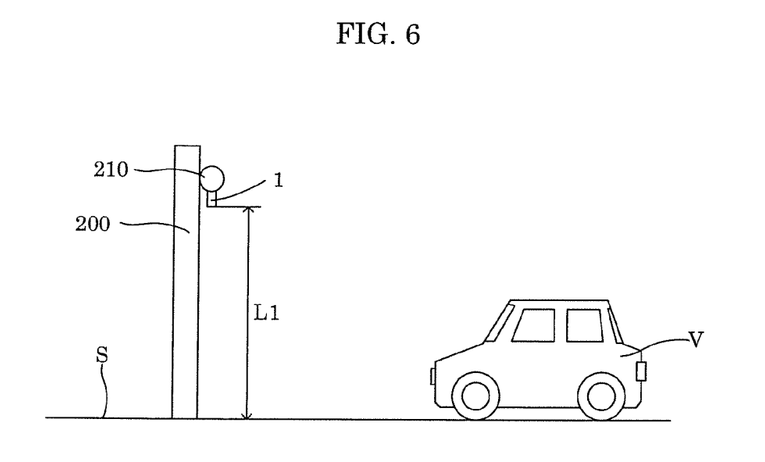
FIG. 6 is an illustrative diagram showing a state in which a vehicle is not present immediately below the water content sensor according to the embodiment.
Figure 7:
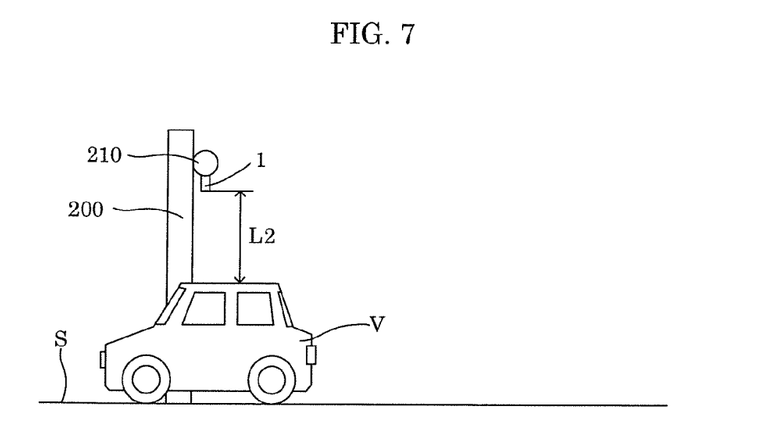
FIG. 7 is an illustrative diagram showing a state in which a vehicle passes immediately below the water content sensor according to the embodiment.

Here, large differences are generated in the signal intensities of the detection light and the reference light between when vehicle V is not present immediately below water content sensor 1 and when vehicle V passes immediately below water content sensor 1. FIG. 6 is an illustrative diagram showing a state in which vehicle V is not present immediately below water content sensor 1 of the present embodiment. This state will be referred to as "first state". FIG. 7 is an illustrative diagram showing a state in which vehicle V passes immediately below water content sensor 1 of the present embodiment. This state will be referred to as "second state".

As shown in FIG. 6, in the first state, the detection light and the reference light travel up and down along distance L1 between water content sensor 1 and road surface S. On the other hand, as shown in FIG. 7, in the second state, the detection light and the reference light travel up and down along distance L2 between water content sensor 1 and vehicle V. Accordingly, the optical paths of the detection light and the reference light are longer in the first state than in the second state. That is, the detection light and the reference light are weaker in the first state than in the second state when the detection light and the reference light return to water content sensor 1. Accordingly, the signal intensity of the first electric signal generated from the detection light and the signal intensity of the second electric signal generated from the reference light are both lower in the first state than in the second state.

Figure 8:
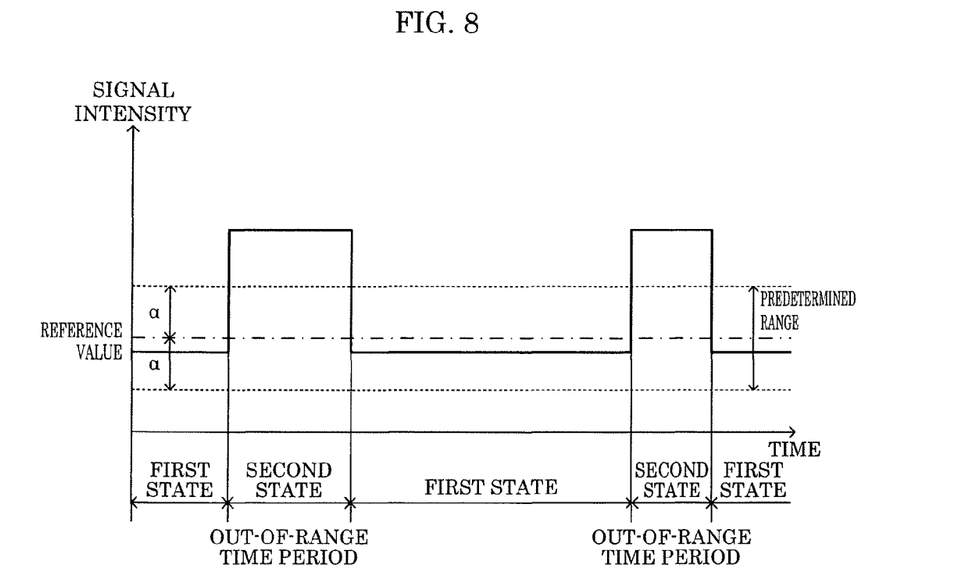
FIG. 8 is a graph showing changes in the signal intensity of a second electric signal generated from reference light according to the embodiment.

FIG. 8 is a graph showing changes in the signal intensity of the second electric signal generated from the reference light of the embodiment. FIG. 8 shows the case of the second electric signal as an example, but substantially similar results are obtained with respect to the first electric signal. Also, in FIG. 8, the changes in the signal intensity are expressed in the form of a pulse waveform, but in reality, a waveform that conforms to the shape of vehicle V is obtained.

As shown in FIG. 8, the signal intensity of the second electric signal is low in the first state, but the signal intensity of the second electric signal is high in the second state. As described above, in the second state, vehicle V passes immediately below water content sensor 1. That is, even if the second electric signal and the first electric signal in the second state are used to perform water amount detection, the result will be inaccurate. For this reason, in order to determine the signal ratio based on which the amount of water is detected, the signal ratio is obtained from the second electric signal and the first electric signal in the first state that are highly reliable by removing the second electric signal and the first electric signal in the second state that are less reliable.

Specifically, a reference value for removing the second electric signal in the second state is determined in advance. The reference value is a value smaller than the signal intensity of the second electric signal in the second state.

Also, a range defined relative to the reference value including ranges corresponding to ±α is set as a predetermined range. The predetermined range is set such that it does not include the signal intensity of the second electric signal in the second state.

An example of the reference value and the predetermined range will now be described.

For example, the reference value may be the intensity of the second electric signal in the first state when water content sensor 1 is installed at a position spaced apart from road surface S by an amount corresponding to distance L1.

Here, it is known that light intensity is inversely proportional to the square of the distance from the light source. For this reason, the relationship between intensity E1 of the second electric signal in the first state and intensity E2 of the second electric signal in the second state is represented by Equation 1 given below.

$$E2 = E1 \cdot L1^2 / L2^2 \qquad (1)$$

For example, in the case where distance L1 is 5 m, and the maximum value of distance L2 is 4.5 m, signal intensity E2 of the second electric signal in the second state and signal intensity E1 of the second electric signal in the first state are estimated by Equation 2 given below.

$$E2/E1 = L1^2/L2^2 = 5^2/4.5^2 \approx 1.23 \qquad (2)$$

As described above, the value of signal intensity E2 of the second electric signal in the second state is greater than the value of signal intensity E1 of the second electric signal in the first state by about 23%. Based on this value, a range defined relative to the reference value including ranges corresponding to ±20% can be set as the predetermined range. Alternatively, with a sufficient margin, a range defined relative to the reference value including ranges corresponding to ±10% may be set as the predetermined range.

In order to correct the influence of the amount of water on road surface S, the reference value may be varied based on the detected signal ratio.

In addition, with respect to the reference value and the predetermined range, appropriate values can be determined based on various experiments, simulations, a history of the signal intensity of the second electric signal in the past, and the like.

If the signal intensity of the second electric signal is within the predetermined range, computation processor 56 determines that the time period is in the first state. On the other hand, if the signal intensity of the second electric signal is outside the predetermined range, computation processor 56 determines that the time period is in the second state. The time period in the second state is an out-of-range time period during which the second electric signal is outside the predetermined range. Computation processor 56 calculates the out-of-range time period, and also calculates the frequency of out-of-range time periods within a predetermined length of time. One out-of-range time period is a period indicating that one vehicle V passed immediately below water content sensor 1. It means that the frequency of out-of-range time periods within a predetermined length of time indicates the amount of traffic of vehicles V within the predetermined length of time. As used herein, the term "predetermined length of time" is a unit time for determining the amount of traffic of vehicles V, and may be minutes or hours. Specifically, the predetermined length of time may be several minutes, ten-odd minutes, 30 minutes, or several hours.

Also, in the present embodiment, an example has been described in which whether a time period is in the first state or the second state is determined based on the signal intensity of the second electric signal. This is because the reference light is less susceptible to water than the detection light. Specifically, the first electric signal generated from the detection light is affected by water, and thus the signal intensity varies irrespective of whether there is vehicle V. On the other hand, the second electric signal generated from the reference light is unlikely to be affected by water, and thus whether or not there is vehicle V is directly reflected in the signal intensity. That is, it is suitable to use the second electric signal to determine whether a time period is in the first state or the second state. It is also possible to use the first electric signal alone or both the first electric signal and the second electric signal to determine whether a time period is in the first state or the second state.

In the description given above, an example has been described in which the signal intensities of the first electric signal and the second electric signal are lower in the first state than in the second state. However, there are cases where the absorbance of light by the surface of vehicle V is much larger than the absorbance of light by road surface S. In this case, the detection light and the reference light are significantly absorbed by the surface of vehicle V, and thus the signal intensities of the first electric signal and the second electric signal are lower in the second state than in the first state. It is desirable to determine the reference value and the predetermined range by taking this case into consideration as well.

Computation processor 56 is, for example, a microcontroller. Computation processor 56 includes a non-volatile memory in which a signal processing program is stored, a volatile memory that is a temporary storage area for executing a program, an input/output port, a processor that executes a program, and the like.

In the non-volatile memory of computation processor 56, a risk table and a temperature table are stored.

Figure 9:
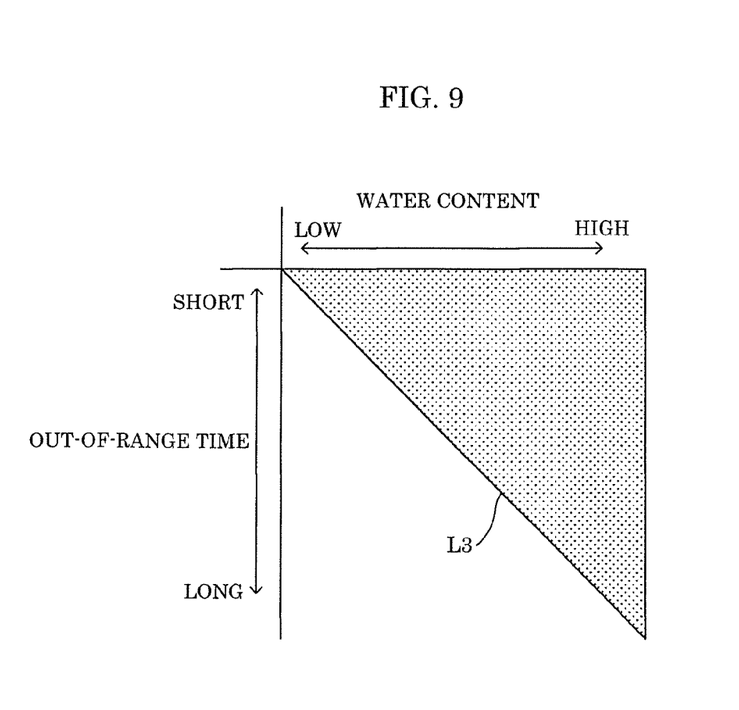
FIG. 9 is an image diagram, based on which a risk table according to the embodiment is created.

The risk table is a table used to determine a risk on road surface S based on the relationship between the out-of-range time period and the amount of water. FIG. 9 is an image diagram based on which the risk table of the embodiment is created. The out-of-range time period is a time period during which vehicle V passes immediately below water content sensor 1. The out-of-range time period indicates the speed of vehicle V. That is, if the out-of-range time period is short, it means that the speed of vehicle V is fast, and thus the risk is high. If the out-of-range time period is long, it means that the speed of vehicle V is slow, and thus the risk is low. Also, if the amount of water is large, road surface S is slippery, and thus the risk is high. If the amount of water is small, road surface S is less slippery, and thus the risk is low. FIG. 9 shows this relationship, and it is assumed that, in FIG. 9, a hatched area that is one of areas formed by dividing the entire area by dividing line L3 is a high-risk area. The risk table is created based on the out-of-range time and the amount of water included in the high-risk area. Specific values of the risk table can be determined based on various experiments, simulations, and the like. Computation processor 56 determines the risk on road surface S based on the risk table, the out-of-range time period, and the amount of water detected.

The temperature table is a table used to determine the temperature on road surface S based on the relationship between the frequency of out-of-range time periods within a predetermined length of time and the ambient temperature of water content sensor 1 detected by temperature sensor 60. As described above, the frequency of out-of-range time periods within a predetermined length of time indicates the amount of traffic of vehicles V within the predetermined length of time. If the frequency is high, the amount of traffic is also large, and thus the road surface temperature of road surface S increases due to friction thereof. That is, the temperature on road surface S is higher than the temperature detected by temperature sensor 60. On the other hand, if the frequency is low, the amount of traffic is also small, and thus the increase in the temperature on road surface S is also small. That is, the temperature on road surface S is about the same as the temperature detected by temperature sensor 60. The temperature table is created based on this relationship such that the temperature on road surface S can be estimated from the ambient temperature of water content sensor 1. Specific values of the temperature table can be determined based on various experiments, simulations, and the like. Computation processor 56 estimates the temperature on road surface S based on the temperature table, the frequency of out-of-range time periods within a predetermined length of time, and the temperature detected by temperature sensor 60. Also, computation processor 56 determines the state of water contained in road surface S based on the temperature on road surface S estimated. Specifically, computation processor 56 determines that the state of water contained in road surface S is "solid" if the temperature on road surface S estimated is less than or equal to 0 degrees, and determines that the state of water contained in road surface S is "liquid" if the temperature is greater than 0 degrees.

Computation processor 56 outputs the risk on road surface S and the state of water from its input/output port to controller 120. By doing so, controller 120 controls display 110 to display information based on the amount of water detected by water content sensor 1 on display 110. The information based on the amount of water includes the risk on road surface S, the state of water, and the like.

[Processing of Detecting Amount of Water]

Next, the processing of detecting the amount of water performed by computation processor 56 will be described.

In the present embodiment, computation processor 56 detects the amount of a component contained in road surface S by comparing light energy Pd of the detection light contained in the reflected light and light energy Pr of the reference light. Light energy Pd corresponds to the intensity of the first electric signal output from first light receiver 33, and light energy Pr corresponds to the intensity of the second electric signal output from second light receiver 43.

Light energy Pd is represented by Equation 3 given below.

$$Pd = Pd0 \times Gd \times Rd \times Td \times Aad \times Ivd \qquad (3)$$

In the equation, Pd0 is the light energy of the light in the first wavelength band that corresponds to the detection light included in the light emitted by light source 22. Gd is the coupling efficiency (light concentration factor) of the light in the first wavelength band with respect to first light receiver 33. Specifically, Gd corresponds to the proportion of a component of the light emitted by light source 22 diffused and reflected by road surface S (or in other words, the detection light included in the reflected light).

Rd is the reflectance of the detection light reflected by road surface S. Td is the transmittance of the detection light by first band-pass filter 32. Ivd is the light receiving sensitivity of first light receiver 33 to the detection light included in the reflected light.

Aad is the absorbance of the detection light by a component (water) contained in road surface S, and is represented by Equation 4 given below.

$$Aad = 10^{-\alpha a \times Ca \times D} \quad (4)$$

In the equation, αa is a predetermined light absorption coefficient, and is specifically the light absorption coefficient of the detection light by the component (water). Ca is the volumetric concentration of the component (water) contained in road surface S. D is a contribution thickness that is twice the thickness of a component that contributes to the absorption of the detection light.

More specifically, in the case where light enters road surface S in which water is uniformly dispersed, and is reflected by and emitted from road surface S, Ca corresponds to the volumetric concentration of the component contained in road surface S. Also, D corresponds to the length of the optical path of the light reflected by and emitted from road surface S. For example, Ca is the concentration of water contained in a liquid phase covering road surface S. Also, D is a contribution thickness converted as an average thickness of the liquid phase covering road surface S.

Accordingly, αa×Ca×D corresponds to the amount of component (the amount of water) contained in road surface S. It can be seen, from the above, that light energy Pd that corresponds to the intensity of the first electric signal varies according to the amount of water on road surface S. The absorbance of moisture is extremely smaller than that of water, and thus is negligible.

Likewise, light energy Pr of the reference light that enters second light receiver 43 is represented by Equation 5 given below.

$$Pr = Pr0 \times Gr \times Rr \times Tr \times Ivr \quad (5)$$

In the present embodiment, the reference light can be deemed as light that is not substantially absorbed by the component contained in road surface S. Accordingly, as can be seen from the comparison with Equation 3, Equation 5 does not include a term that corresponds to Aad that is the absorbance by water.

In Equation 5, Pr0 is the light energy of the light in the second wavelength band that corresponds to the reference light included in the light emitted by light source 22. Gr is the coupling efficiency (light concentration factor) of the reference light emitted by light source 22 with respect to second light receiver 43. Specifically, Gr corresponds to the proportion of a component of the reference light diffused and reflected by road surface S (or in other words, the reference light included in the reflected light). Rr is the reflectance of the reference light reflected by road surface S. Tr is the transmittance of the reference light by second band-pass filter 42. Ivr is the light receiving sensitivity of second light receiver 43 to the reflected light.

In the present embodiment, the light projected from light source 22, or in other words, the detection light and the reference light are projected coaxially and with the same spot size, and thus coupling efficiency Gd of the detection light and coupling efficiency Gr of the reference light are substantially equal. Also, the peak wavelength of the detection light and the peak wavelength of the reference light are relatively close, and thus reflectance Rd of the detection light and reflectance Rr of the reference light are substantially equal.

Accordingly, the following Equation 6 is derived from the ratio (signal ratio) of Equation 3 and Equation 5.

$$Pd/Pr = Z \times Aad \quad (6)$$

In the equation, Z is a constant term, and is represented by Equation 7.

$$Z = (Pd0/Pr0) \times (Td/Tr) \times (Ivd/Ivr)$$

Light energy Pd0 and light energy Pr0 are determined in advance as the initial output of light source 22. Also, transmittance Td and transmittance Tr are determined in advance based on the transmission properties of first band-pass filter 32 and second band-pass filter 42, respectively. Light receiving sensitivity Ivd and light receiving sensitivity Ivr are determined in advance based on the light receiving properties of first light receiver 33 and second light receiver 43, respectively. Accordingly, Z represented by Equation 7 can be deemed as a constant.

Computation processor 56 calculates light energy Pd of the detection light based on the first electric signal, and calculates light energy Pr of the reference light based on the second electric signal. Specifically, the signal level (voltage level) of the first electric signal corresponds to light energy Pd, and the signal level (voltage level) of the second electric signal corresponds to light energy Pr.

Accordingly, computation processor 56 can calculate Aad that is the absorbance by water contained in road surface S based on Equation 6. Accordingly, computation processor 56 can calculate the amount of water based on Equation 4.

In this example, water content sensor 1 projects light to road surface S at a very small time interval of, for example, 100 msec or the like, and determines the signal ratio between the first electric signal and the second electric signal with respect to road surface S each time. For this reason, the signal ratio is determined a plurality of times during each of the time period in the first state and the time period in the second state. As described above, inaccurate values are obtained if the first electric signal and the second electric signal in the time period in the second state are used, and thus the amount of water is detected by using only the signal ratio obtained in the time period in the first state. Specifically, computation processor 56 detects the amount of water based on an average value of a plurality of signal ratios obtained in one instance of the time period in the first state. With this configuration, the accuracy of the detected amount of water can be increased.

Moisture (water vapor) is also present in space 3, but there may be cases where the detection light and the reference light are absorbed by water vapor. Signal processing circuit 50 may also include a corrector that corrects the first electric signal and the second electric signal so as to cancel the amount of light absorbed by water vapor.

[Operations of Road Surface State Detection Device]

Next, the operations of road surface state detection device 100 will be described. First, controller 120 controls water content sensor 1 to detect the amount of water on road surface S. At this time, computation processor 56 of water content sensor 1 obtains, each time a time period is determined as the first state, an average amount of water during the time period in the first state. Also, computation processor 56 determines the risk on road surface S based on the amount of water detected, the out-of-range time period, and the risk table. At the same time, computation processor 56 estimates the temperature on road surface S based on the temperature table, the frequency of out-of-range time periods within a predetermined length of time, and the temperature detected by temperature sensor 60. Also, computation processor 56 determines the state of water contained in road surface S based on the temperature on road surface S estimated. Computation processor 56 outputs the risk on road surface S and the state of water to controller 120.

Controller 120 controls display 110 to display information based on the amount of water detected by water content sensor 1 on display 110. The information based on the amount of water includes the risk on road surface S, the state of water, content to be displayed that is determined based on the risk on road surface S and the state of water, and the like. Specifically, if computation processor 56 determines that the state of water is "solid" and the risk is "high", controller 120 controls display 110 to display an alert message such as, for example, "icy road, slow down". If computation processor 56 determines that the state of water is "liquid" and the risk is "high", controller 120 controls display 110 to display an alert message such as, for example, "slow down". If computation processor 56 determines that the risk is "low", controller 120 controls display 110 to not display an alert message. The amount of water detected by water content sensor 1 may be displayed on display 110.

[Effects, etc.]

As described above, the present embodiment provides water content sensor 1 that emits light to road surface S and detects an amount of water on road surface S based on reflected light from road surface S, water content sensor 1 including: light emitter 20 that emits the light toward road surface S, the light including detection light having a first wavelength band in which absorption by water is greater than a predetermined value and reference light having a second wavelength band in which the absorption by water is less than or equal to the predetermined value; first light receiver 33 that receives the detection light reflected by road surface S and converts the received detection light to a first electric signal; second light receiver 43 that receives the reference light reflected by road surface S and converts the received reference light to a second electric signal; and computation processor 56 that detects the amount of water on road surface S based on a signal ratio between the first electric signal and the second electric signal, wherein computation processor 56 detects the amount of water based on the signal ratio obtained when a signal intensity of at least one of the first electric signal and the second electric signal is within a predetermined range defined relative to a reference value.

With this configuration, a less reliable signal ratio that does not fall within the predetermined range due to the influence of the passage of vehicle V can be removed. Accordingly, a highly reliable signal ratio that falls within the predetermined range can be used to detect the amount of water. As a result, the influence of vehicle V moving on road surface S can be suppressed, and the accuracy of the result of detection can be increased.

Also, computation processor 56 detects the amount of water based on an average value of signal ratios obtained when the signal intensity of at least one of the first electric signal and the second electric signal is within the predetermined range, the signal ratios each being the signal ratio between the first electric signal and the second electric signal.

With this configuration, computation processor 56 detects the amount of water based on an average value of a plurality of signal ratios obtained during a time period in the first state, and thus the accuracy of the detected amount of water can be increased.

Also, computation processor 56 detects the amount of water based on the signal ratio obtained when the signal intensity of the second electric signal is within the predetermined range.

With this configuration, the amount of water can be detected based on the signal ratio obtained when the signal intensity of the second electric signal generated from the reference light that is less susceptible to water is within the predetermined range.

Also, computation processor 56 includes a risk table used to determine a risk on road surface S based on a relationship between the amount of water and an out-of-range time period that is a period during which the signal intensity of at least one of the first electric signal and the second electric signal is outside the predetermined range, and computation processor 56 calculates the out-of-range time period, and determines the risk based on the out-of-range time period, the amount of water detected, and the risk table.

With this configuration, the current risk of vehicle V against road surface S can be determined based on the amount of water and the out-of-range time period.

Also, water content sensor 1 includes temperature sensor 60 that detects an ambient temperature of water content sensor 1. Computation processor 56 includes a temperature table used to determine a temperature on road surface S based on a relationship between the ambient temperature of water content sensor 1 and a frequency that is the number of times the signal intensity of at least one of the first electric signal and the second electric signal is outside the predetermined range within a predetermined length of time. Computation processor 56 calculates the frequency, and estimates the temperature on road surface S based on the calculated frequency, the temperature detected by temperature sensor 60, and the temperature table.

With this configuration, the temperature on road surface S can be estimated based on the frequency, and the ambient temperature of water content sensor 1 detected by temperature sensor 60. Accordingly, for example, the cost can be reduced as compared with the case where a contactless temperature sensor such as an infrared temperature sensor is used. In order to detect the temperature on road surface S, a contactless temperature sensor may be used.

Also, computation processor 56 determines a state of water contained in road surface S based on the temperature on road surface S estimated.

With this configuration, it is possible to determine, based on the temperature on road surface S estimated, whether the water contained in road surface S is liquid or solid. Accordingly, the slipperiness of road surface S can be determined.

Also, road surface state detection device 100 according to the present embodiment includes water content sensor 1 described above, and display 110 that displays information based on the amount of water detected by water content sensor 1.

With this configuration, display 110 can inform information based on the amount of water. Accordingly, people who have received the information can easily take measures against the amount of water.

Other Embodiments

Water content sensor 1 according to the present invention has been described by way of the embodiment given above, but the present invention is not limited to the embodiment given above.

For example, in the embodiment given above, an example has been described in which light source 22 is an LED light source, but the light source may be a semiconductor laser element, an organic EL element, or the like.

Also, in the embodiment given above, an example has been described in which one light source 22 emits continuous light including light in the first wavelength band that corresponds to the detection light and light in the second wavelength band that corresponds to the reference light. However, a plurality of light sources may be provided such that one of the light sources emits the detection light, and another light source emits the reference light.

Also, in the embodiment given above, an example has been described in which light source controller 51, first signal processor 54, second signal processor 55, and computation processor 56 included in signal processing circuit 50 are configured using dedicated microcontrollers. However, the signal processing circuit may be implemented by using one microcontroller as a whole.

Also, in the embodiment given above, an example has been described in which road surface state detection device 100 is installed on a roadway. However, road surface state detection device 100 can be installed in facilities other than roadways. For example, road surface state detection device 100 can be installed in commercial facilities such as shopping malls In commercial facilities, the road surface state varies due to not only rain and snow, but also water sprinkled as an attraction, a spilled drink, and the like. Accordingly, when road surface state detection device 100 is installed in a commercial facility, it is possible to inform people in the commercial facility of the road surface state. Also, there are cases where people moving on the road surface, shopping carts, and the like block the light emitted from water content sensor 1. In this case as well, with road surface state detection device 100 described above, because the influence of mobile bodies that pass immediately below water content sensor 1 is reduced, the road surface state can be determined accurately.

The present invention also encompasses other embodiments obtained by making various modifications that can be conceived by a person having ordinary skill in the art to the above embodiment, as well as embodiments implemented by any combination of the structural elements and the functions of the above embodiment without departing from the scope of the present invention.

REFERENCE MARKS IN THE DRAWINGS

1 water content sensor
20 light emitter
33 first light receiver
43 second light receiver
56 computation processor
60 temperature sensor
100 road surface state detection device
110 display
S road surface

The invention claimed is:

1. A water content sensor that emits light to a road surface and detects an amount of water on the road surface based on reflected light reflected by the road surface, the water content sensor comprising:
a light emitter that emits the light toward the road surface, the light including detection light having a first wavelength band in which absorption by water is greater than a predetermined value and reference light having a second wavelength band in which the absorption by water is less than or equal to the predetermined value;
a first light receiver that receives the detection light reflected by the road surface and converts the detection light to a first electric signal;
a second light receiver that receives the reference light reflected by the road surface and converts the reference light to a second electric signal; and
a computation processor that detects the amount of water on the road surface based on a signal ratio between the first electric signal and the second electric signal,
wherein the computation processor detects the amount of water based on the signal ratio obtained when a signal intensity of at least one of the first electric signal and the second electric signal is within a predetermined range defined relative to a reference value,
the computation processor includes a risk table used to determine a risk on the road surface based on a relationship between the amount of water and an out-of-range time period that is a period during which the signal intensity of at least one of the first electric signal and the second electric signal is outside the predetermined range, and
the computation processor calculates the out-of-range time period, and determines the risk based on the out-of-range time period, the amount of water detected, and the risk table.

2. The water content sensor according to claim 1, wherein the computation processor detects the amount of water based on an average value of signal ratios obtained when the signal intensity of at least one of the first electric signal and the second electric signal is within the predetermined range, the signal ratios each being the signal ratio between the first electric signal and the second electric signal.

3. The water content sensor according to claim 1, wherein the computation processor detects the amount of water based on the signal ratio obtained when the signal intensity of the second electric signal is within the predetermined range.

4. The water content sensor according to claim 1, further comprising:
a temperature sensor that detects an ambient temperature of the water content sensor,
wherein the computation processor includes a temperature table used to determine a temperature on the road surface based on a relationship between the ambient temperature of the water content sensor and a frequency that is a number of times the signal intensity of at least one of the first electric signal and the second electric signal is outside the predetermined range within a predetermined length of time, and
the computation processor calculates the frequency, and estimates the temperature on the road surface based on the frequency, the temperature detected by the temperature sensor, and the temperature table.

5. The water content sensor according to claim 4, wherein the computation processor determines a state of water contained in the road surface based on the temperature on the road surface estimated.

6. A road surface state detection device, comprising:
the water content sensor according to claim 1; and
a display that displays information based on the amount of water detected by the water content sensor.

7. A water content sensor that emits light to a road surface and detects an amount of water on the road surface based on reflected light reflected by the road surface, the water content sensor comprising:
a light emitter that emits the light toward the road surface, the light including detection light having a first wavelength band in which absorption by water is greater than a predetermined value and reference light having a second wavelength band in which the absorption by water is less than or equal to the predetermined value;

a first light receiver that receives the detection light reflected by the road surface and converts the detection light to a first electric signal;

a second light receiver that receives the reference light reflected by the road surface and converts the reference light to a second electric signal;

a computation processor that detects the amount of water on the road surface based on a signal ratio between the first electric signal and the second electric signal; and a temperature sensor that detects an ambient temperature of the water content sensor, wherein the computation processor detects the amount of water based on the signal ratio obtained when a signal intensity of at least one of the first electric signal and the second electric signal is within a predetermined range defined relative to a reference value, the computation processor includes a temperature table used to determine a temperature on the road surface based on a relationship between the ambient temperature of the water content sensor and a frequency that is a number of times the signal intensity of at least one of the first electric signal and the second electric signal is outside the predetermined range within a predetermined length of time, and the computation processor calculates the frequency, and estimates the temperature on the road surface based on the frequency, the temperature detected by the temperature sensor, and the temperature table.

* * * * *